(12) United States Patent
Wei et al.

(10) Patent No.: US 11,677,448 B2
(45) Date of Patent: Jun. 13, 2023

(54) DMRS ENHANCEMENT FOR HIGHER ORDER MU-MIMO

(71) Applicant: QUALCOMM INCORPORATED, San Diego, CA (US)

(72) Inventors: Chao Wei, Beijing (CN); Wanshi Chen, San Diego, CA (US); Peter Gaal, San Diego, CA (US); Guodong Li, Beijing (CN); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 15/549,597

(22) PCT Filed: Feb. 9, 2016

(86) PCT No.: PCT/CN2016/073736
§ 371 (c)(1),
(2) Date: Aug. 8, 2017

(87) PCT Pub. No.: WO2016/127939
PCT Pub. Date: Aug. 18, 2016

(65) Prior Publication Data
US 2018/0026684 A1 Jan. 25, 2018

(51) Int. Cl.
*H04B 7/0452* (2017.01)
*H04B 7/0456* (2017.01)
(Continued)

(52) U.S. Cl.
CPC ......... *H04B 7/0452* (2013.01); *H04B 7/0456* (2013.01); *H04L 5/0007* (2013.01);
(Continued)

(58) Field of Classification Search
CPC .... H04J 11/00; H04J 13/00; H04J 1/00; H04J 3/00; H04J 4/00; H04W 74/00; H04W 72/00
See application file for complete search history.

(56) References Cited

U.S. PATENT DOCUMENTS 8,774,736 B2   7/2014   Choi et al.
9,019,904 B2 *  4/2015  Lee ...................... H04L 5/0051
                                                           370/329
(Continued)

FOREIGN PATENT DOCUMENTS

CN   102158319 A   8/2011
CN   102195923 A   9/2011
(Continued)

OTHER PUBLICATIONS

WO 2015/071001 A1 (Year: 2015).*
(Continued)

*Primary Examiner* — Rushil Parimal Sampat
(74) *Attorney, Agent, or Firm* — Qualcomm Incorporated

(57) ABSTRACT

Certain aspects of the present disclosure support demodulation reference signal (DMRS) enhancement for higher order multi-user multiple-input multiple-output (MU-MIMO) communications. An example method generally includes determining a plurality of ports of a multi-dimensional array of transmit antennas and a number of spatial multiplexed layers for transmission to a plurality of user equipments (UEs), configuring a demodulation reference signal (DMRS) pattern by multiplexing the layers or the ports in the DMRS pattern, using an orthogonal cover code (OCC) and one or more code division multiplexing (CDM) groups, and transmitting DMRS symbols based on the configured DMRS pattern using the multiplexed layers and the ports.

26 Claims, 18 Drawing Sheets

(51) Int. Cl.
*H04L 5/00* (2006.01)
*H04L 25/02* (2006.01)
*H04W 72/04* (2009.01)
*H04W 72/12* (2009.01)
*H04W 72/0453* (2023.01)

(52) U.S. Cl.
CPC .......... *H04L 5/0021* (2013.01); *H04L 5/0048* (2013.01); *H04L 25/0242* (2013.01); *H04W 72/0453* (2013.01); *H04W 72/1289* (2013.01)

(56) References Cited

U.S. PATENT DOCUMENTS

| | | | | |
|---|---|---|---|---|
| 9,019,924 | B2* | 4/2015 | Ng | H04W 72/042 |
| | | | | 370/329 |
| 9,025,560 | B2* | 5/2015 | Han | H04L 5/0053 |
| | | | | 370/330 |
| 9,554,381 | B2* | 1/2017 | Park | H04B 7/04 |
| 2011/0176517 | A1 | 7/2011 | Hu et al. | |
| 2012/0014318 | A1 | 1/2012 | Luo et al. | |
| 2013/0010836 | A1* | 1/2013 | Sartori | H04L 5/0051 |
| | | | | 375/E1.003 |
| 2013/0021991 | A1* | 1/2013 | Ko | H04B 7/0413 |
| | | | | 370/329 |
| 2013/0022087 | A1* | 1/2013 | Chen | H04L 27/2613 |
| | | | | 375/147 |
| 2013/0083752 | A1* | 4/2013 | Kim | H04L 5/0048 |
| | | | | 370/329 |
| 2013/0195034 | A1* | 8/2013 | Noh | H04W 72/0466 |
| | | | | 370/329 |
| 2014/0226636 | A1 | 8/2014 | Xu et al. | |
| 2014/0233466 | A1* | 8/2014 | Pourahmadi | H04L 5/0053 |
| | | | | 370/329 |
| 2014/0302887 | A1* | 10/2014 | Bashar | H04W 4/70 |
| | | | | 455/550.1 |
| 2016/0182203 | A1* | 6/2016 | Fang | H04W 72/04 |
| | | | | 370/329 |
| 2018/0316469 | A1* | 11/2018 | Jiang | H04L 5/0048 |

FOREIGN PATENT DOCUMENTS

| | | |
|---|---|---|
| CN | 102714527 A | 10/2012 |
| CN | 102857458 A | 1/2013 |
| CN | 102859958 A | 1/2013 |
| CN | 103209490 A | 7/2013 |
| CN | 103974418 A | 8/2014 |
| CN | 104080180 A | 10/2014 |
| CN | 104247359 A | 12/2014 |
| JP | 2013517713 A | 5/2013 |
| WO | 2011090282 A2 | 7/2011 |
| WO | WO-2011085402 | 7/2011 |
| WO | WO-2012071721 A1 | 6/2012 |
| WO | 2014046516 A1 | 3/2014 |
| WO | 2014130082 A1 | 8/2014 |
| WO | WO-2014157921 A1 | 10/2014 |

OTHER PUBLICATIONS

Fujitsu: "DM-RS OCC Design for Rank 5-8 in LTE-Advanced", 3GPP Draft; R1-103220, 3rd Generation Partnership Project (3GPP), Mobile Competence Centre, 650, Route Des Lucioles, F-06921, Sophia-Anti Polis Cedex, France, vol. RAN WG1, No. Montreal, Canada; May 10, 2010, May 4, 2010, XP050420257, [retrieved on May 4, 2010], 5 pages.

LG Electronics: "Investigation on Downlink DM-RS RB-bundling", 3GPP Draft; R1-100653_RB_BUNDLING_LG, 3rd Generation Partnership Project (3GPP), Mobile Competence Centre, 650, Route Des Lucioles, F-06921, Sophia-Anti Polis Cedex, France, vol. RAN WG1, No. Valencia, Spain; Jan. 18, 2010, Jan. 12, 2010, XP050418250, [retrieved on Jan. 12, 2010], 6 pages.

NEC Group: "Views on the Use of DM RS Ports / Scrambling Sequences for MU-MIMO", 3GPP Draft; R1-103830-MU-MIMO-PORT, 3rd Generation Partnership Project (3GPP), Mobile Competence Centre, 650, Route Des Lucioles, F-06921, Sophia-Anti Polis Cedex, France, vol. RAN WG1, No. Dresden, Germany; Jun. 28, 2010, Jun. 22, 2010, XP050449248, [retrieved on Jun. 22, 2010], 6 pages.

Supplementary European Search Report—EP16748740—Search Authority—Munich—dated Jul. 30, 2018.

International Search Report and Written Opinion—PCT/CN2015/072636—ISA/EPO—dated Nov. 25, 2015.

International Search Report and Written Opinion—PCT/CN2016/073736—ISA/EPO—dated Apr. 28, 2016.

CMCC: "DMRS Design for Higher Order MU-MIMO", 3GPP Draft; R1-150449, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 9, 2015-Feb. 13, 2015, Feb. 8, 2015, XP050933657, 9 pages, Retrieved from the Internet URL: http://www.3gpp.org/ftp/Meetings_3GPP_SYNC/RAN1/Docs/ [retrieved Feb. 8, 2015].

Fujitsu: "Discussion on Possible DM-RS Enhancement for EBF/FD-MIMO", 3GPP Draft: R1-150188_DM_RS_ENHANCEMENT, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 9, 2015-Feb. 13, 2015, Feb. 8, 2015, XP050933402, 4 Pages, Retrieved from the Internet URL: http://www.3gpp.org/ftp/Meetings_3GPP_SYNC/RAN1/Docs/[retrieved on Feb. 8, 2015].

KDDI: "Signaling Design of DMRS for UL CoMP", 3GPP TSG RAN WG1 Meeting #68bis, R1-121596, Jeju, Korea, Mar. 26-30, 2012, pp. 1-7, Mar. 19, 2012.

* cited by examiner

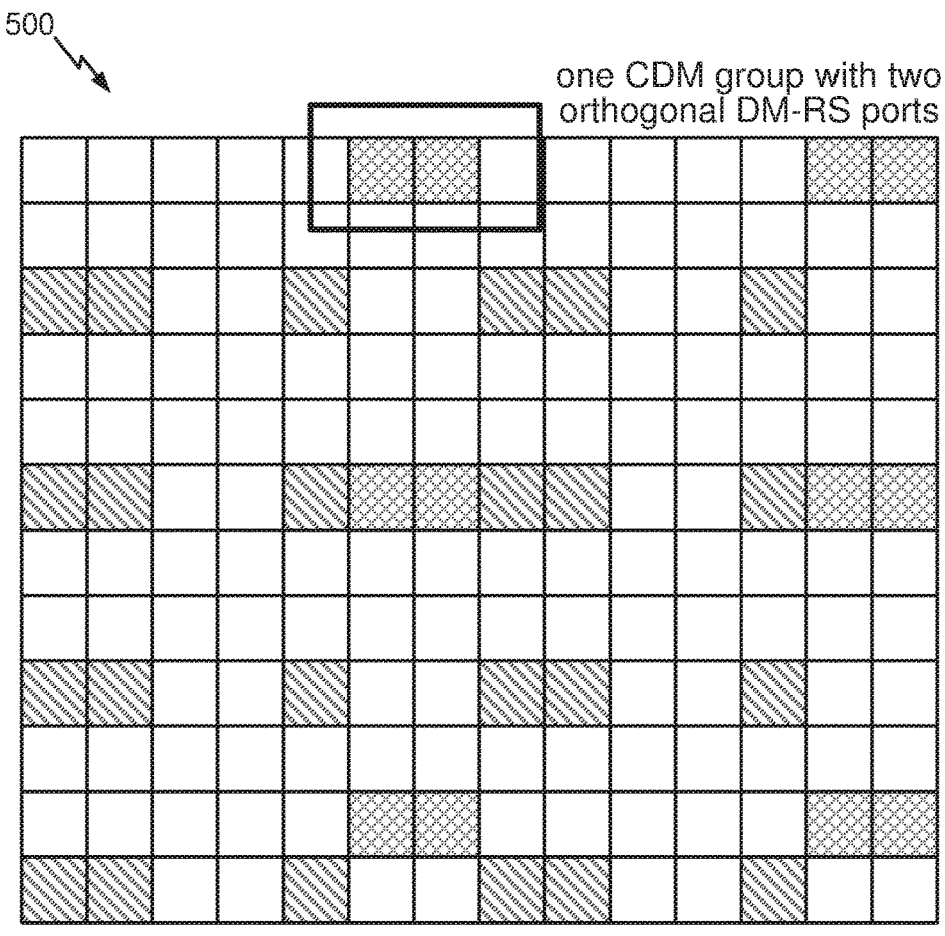
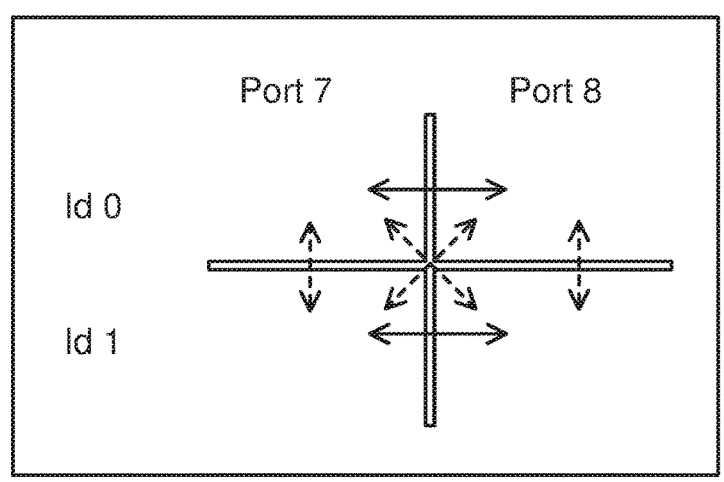
FIG. 5

902 →

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

904 →

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7 | 0 | 2 layers, ports 7-8 |
| 1 | 1 layer, port 11 | 1 | 2 layers, ports 11-13 |
| 2 | 1 layer, port 8 | 2 | 3 layers, ports 7-9 |
| 3 | 1 layer, port 13 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

*FIG. 9*

| Value | UE rank (#layer) | Antenna port and scrambling identity | DMRS pattern and total number of layers for MU-MIMO | SU/MU transmission |
|---|---|---|---|---|
| 0 | 1 | Port 7, SCID=0 | Legacy OCC-2, 12 RE | SU/MU |
| 1 | 1 | Port 7, SCID=1 | Legacy OCC-2, 12 RE | SU/MU |
| 2 | 1 | Port 8, SCID=0 | Legacy OCC-2, 12 RE | SU/MU |
| 3 | 1 | Port 8, SCID=1 | Legacy OCC-2, 12 RE | SU/MU |
| 4 | 1 | Port 7 | Enhanced OCC-4, 12 (4-layer) or 24 RE (8-layer) | MU |
| 5 | 1 | Port 11 | Enhanced OCC-4, 12 (4-layer) or 24 RE (8-layer) | MU |
| 6 | 1 | Port 8 | Enhanced OCC-4, 12 (4-layer) or 24 RE (8-layer) | MU |
| 7 | 1 | Port 13 | Enhanced OCC-4, 12 (4-layer) or 24 RE (8-layer) | MU |
| 8 | 1 | Port 9 | Enhanced OCC-4, 24 RE, up to 8-layer MU | MU |
| 9 | 1 | Port 12 | Enhanced OCC-4, 24 RE, up to 8-layer MU | MU |
| 10 | 1 | Port 10 | Enhanced OCC-4, 24 RE, up to 8-layer MU | MU |
| 11 | 1 | Port 14 | Enhanced OCC-4, 24 RE, up to 8-layer MU | MU |
| 12 | 2 | Port 7-8 | Legacy OCC-2, 24 RE | SU retransmission |
| 13 | 2 | Port 7-9 | Legacy OCC-2, 24 RE | SU retransmission |
| 14 | 2 | Port 7-10 | Legacy OCC-2, 24 RE | SU retransmission |
| 15 | Reserved | | | |

| Value | UE rank (#layer) | Antenna port and scrambling identity | DMRS pattern and total number of layers for MU-MIMO | SU/MU transmission |
|---|---|---|---|---|
| 0 | 2 | Port 7-8, SCID=0 | Legacy OCC-2, 12 RE | SU/MU |
| 1 | 2 | Port 7-8, SCID=1 | Legacy OCC-2, 12 RE | SU/MU |
| 2 | 2 | Port 7-8 | Enhanced OCC-4, 12 (4-layer) or 24 RE (8-layer) | MU |
| 3 | 2 | Port 11-13 | Enhanced OCC-4, 12 (4-layer) or 24 RE (8-layer) | MU |
| 4 | 2 | Port 9-10 | Enhanced OCC-4, 24 RE, up to 8-layer MU | MU |
| 5 | 2 | Port 12-14 | Enhanced OCC-4, 24 RE, up to 8-layer MU | MU |
| 6 | 3 | Port 7-9 | Legacy OCC-2, 24 RE | SU only |
| 7 | 4 | Port 7-10 | Legacy OCC-2, 24 RE | SU only |
| 8 | 5 | Port 7-11 | Legacy OCC-2, 24 RE | SU only |
| 9 | 6 | Port 7-12 | Legacy OCC-2, 24 RE | SU only |
| 10 | 7 | Port 7-13 | Legacy OCC-2, 24 RE | SU only |
| 11 | 8 | Port 7-14 | Legacy OCC-2, 24 RE | SU only |
| 12 | 3 | Port 7-9 | Enhanced OCC-4, 24 RE, up to 8-layer MU | MU |
| 13 | 4 | Port 7-10 | Enhanced OCC-4, 24 RE, up to 8-layer MU | MU |
| 14 | Reserved | | | |
| 15 | Reserved | | | |

*FIG. 11*

| | 1st subcarrier (a, b, c, d) | 2nd subcarrier (d, c, b, a) | 3rd subcarrier (b, c, d, a) | 4th subcarrier (a, d, c, b) |
|---|---|---|---|---|
| DMRS port 11 | {1, 1, -1, -1} | {-1, -1, 1, 1} | {1, -1, -1, 1} | {1, -1, -1, 1} |
| DMRS port 13 | {1, -1, -1, 1} | {1, -1, -1, 1} | {-1, -1, 1, 1} | {1, 1, -1, -1} |
| DMRS port 12 | {-1, -1, 1, 1} | {1, 1, -1, -1} | {-1, 1, 1, -1} | {-1, 1, 1, -1} |
| DMRS port 14 | {-1, 1, 1, -1} | {-1, 1, 1, -1} | {1, 1, -1, -1} | {-1, -1, 1, 1} |

DMRS ENHANCEMENT FOR HIGHER ORDER MU-MIMO

CROSS-REFERENCE TO RELATED APPLICATIONS

This application claims benefit to PCT Application No. PCT/CN2015/072636, entitled "DMRS Enhancement for Higher Order MU-MIMO," filed Feb. 10, 2015, and assigned to the assignee hereof, the contents of which are herein incorporated by reference.

BACKGROUND

Field

Certain aspects of the present disclosure generally relate to wireless communications and, more particularly, to demodulation reference signal (DMRS) enhancement for higher order multi-user multiple-input multiple-output (MU-MIMO) communications.

Background

Wireless communication networks are widely deployed to provide various communication services such as voice, video, packet data, messaging, broadcast, etc. These wireless networks may be multiple-access networks capable of supporting multiple users by sharing the available network resources(e.g., bandwidth and transmit power). Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, $3^{rd}$ Generation Partnership Project (3GPP) Long Term Evolution (LTE) networks, and Long Term Evolution Advanced (LTE-A) networks.

A wireless communication network may include a number of base stations that can support communication with a number of user equipments (UEs). A UE may communicate with a base station via the downlink and uplink. The downlink (or forward link) refers to the communication link from the base station to the LTE, and the uplink (or reverse link) refers to the communication link from the UE to the base station. A base station may transmit data and control information on the downlink to a UE and/or may receive data and control information on the uplink from the UE. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

SUMMARY

Certain aspects of the present disclosure provide a method for wireless communications by a base station (BS). The method generally includes determining a plurality of ports of a multi-dimensional array of transmit antennas and a number of spatial multiplexed layers for transmission to a plurality of user equipments (UEs), configuring an orthogonal demodulation reference signal (DMRS) pattern by multiplexing the layers or the ports in the DMRS pattern, using an orthogonal cover code (OCC) and one or more code division multiplexing (CDM) groups, and transmitting DMRS symbols based on the configured DMRS pattern using the multiplexed layers and the ports.

Certain aspects of the present disclosure provide a method for wireless communications by a user equipment (UE). The method generally includes receiving, from a base station (BS), a downlink (DL) control signaling indicative of an orthogonal demodulation reference signal (DMRS) pattern, determining, based on the DL control signaling, ports of a multi-dimensional array of antennas and spatial multiplexed layers for DMRS symbols transmission, the ports and the layers being multiplexed in the orthogonal DMRS pattern using an orthogonal cover code (OCC) and one or more code division multiplexing (CDM) groups, and receiving the DMRS symbols based on the determination.

Numerous other aspects are provided including methods, apparatus, systems, computer program products, and processing systems.

BRIEF DESCRIPTION OF THE DRAWINGS

FIG. 5 illustrates an example quasi-orthogonal demodulation reference signal (DMRS) structure, in accordance with certain aspects of the present disclosure.

FIG. 9 illustrates examples of downlink (DL) control signaling for DMRS pattern and port indication, in accordance with certain aspects of the present disclosure.

FIG. 10 illustrates examples of joint DMRS pattern and port indication with one codeword enabled, in accordance with certain aspects of the present disclosure.

FIG. 11 illustrates examples of joint DMRS pattern and port indication with two codewords enabled, in accordance with certain aspects of the present disclosure.

DETAILED DESCRIPTION

Figure 1:
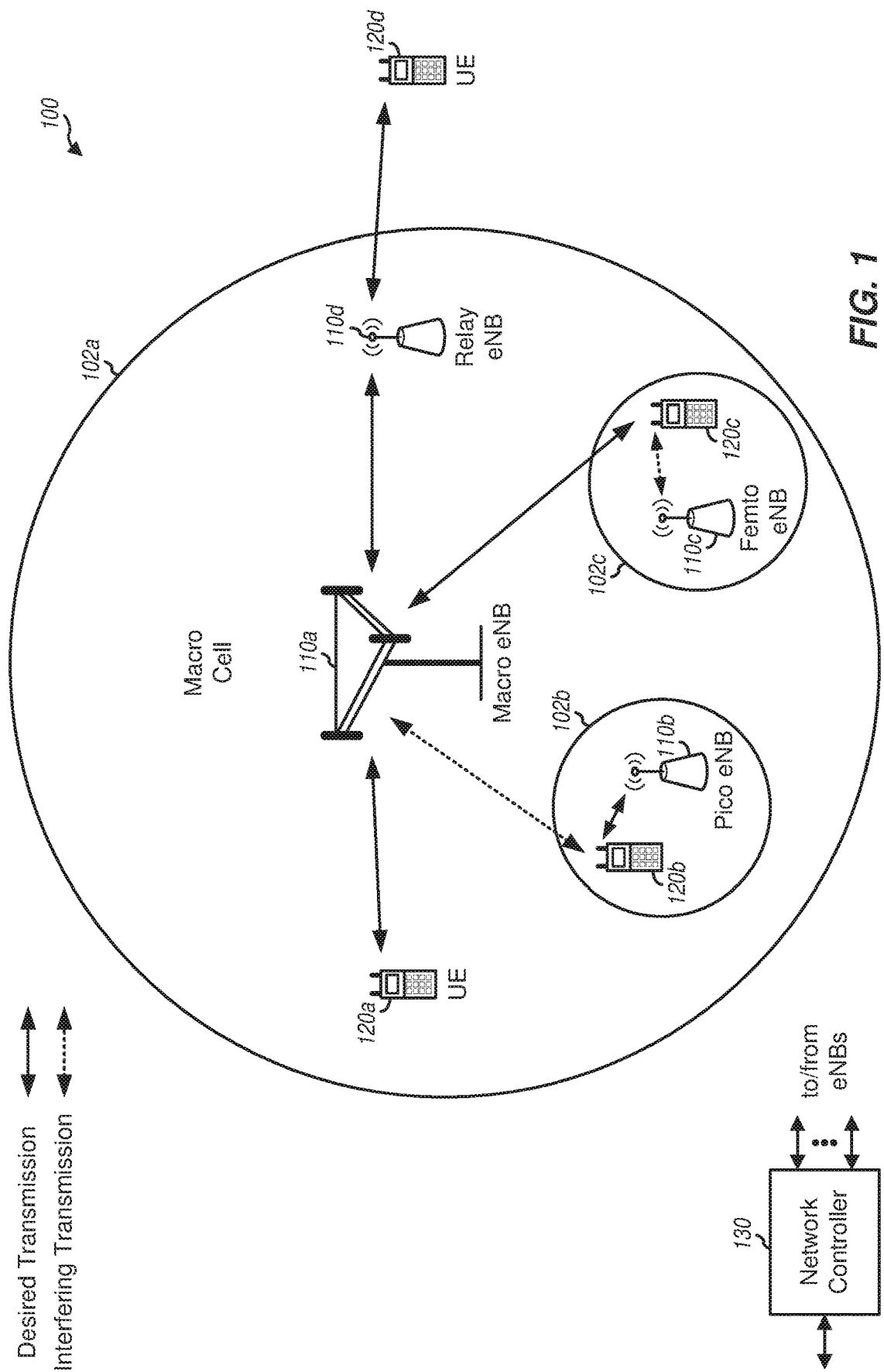
FIG. 1 is a block diagram conceptually illustrating an example wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTFRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE, LTE-A, and the Evolved UTRA.

FIG. 1 shows a wireless communication network 100, which may be an LTE network or some other wireless network, in which aspects of the present disclosure may be practiced. Wireless network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a picoeNB. An eNB for a femto cell may be referred to as a femtoeNB or a home eNB (HeNB). In the example shown in FIG. 1, an eNB 110a may be a macro eNB for a macro cell 102a, an eNB 110b may be a picoeNB for a pico cell 102b and an eNB 110c may be a femtoeNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, picoeNBs, femtoeNBs, relay eNBs, etc. These different types of eNBs may have different transmit power levels, different coverage areas, and different impact on interference in wireless network 100. For example, macro eNBs may have a high transmit power level (e.g., 5 to 40 W) whereas picoeNBs, femtoeNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station (MS), a subscriber unit, a station (STA), etc. A UE may be a cellular phone, a personal digital assistant (PDA) a wireless modem, a wireless communication device, a handheld device, a laptop computer, a cordless phone, a wireless local loop (WLL) station, a tablet, a smart phone, a netbook, a smartbook, etc.

Figure 2:
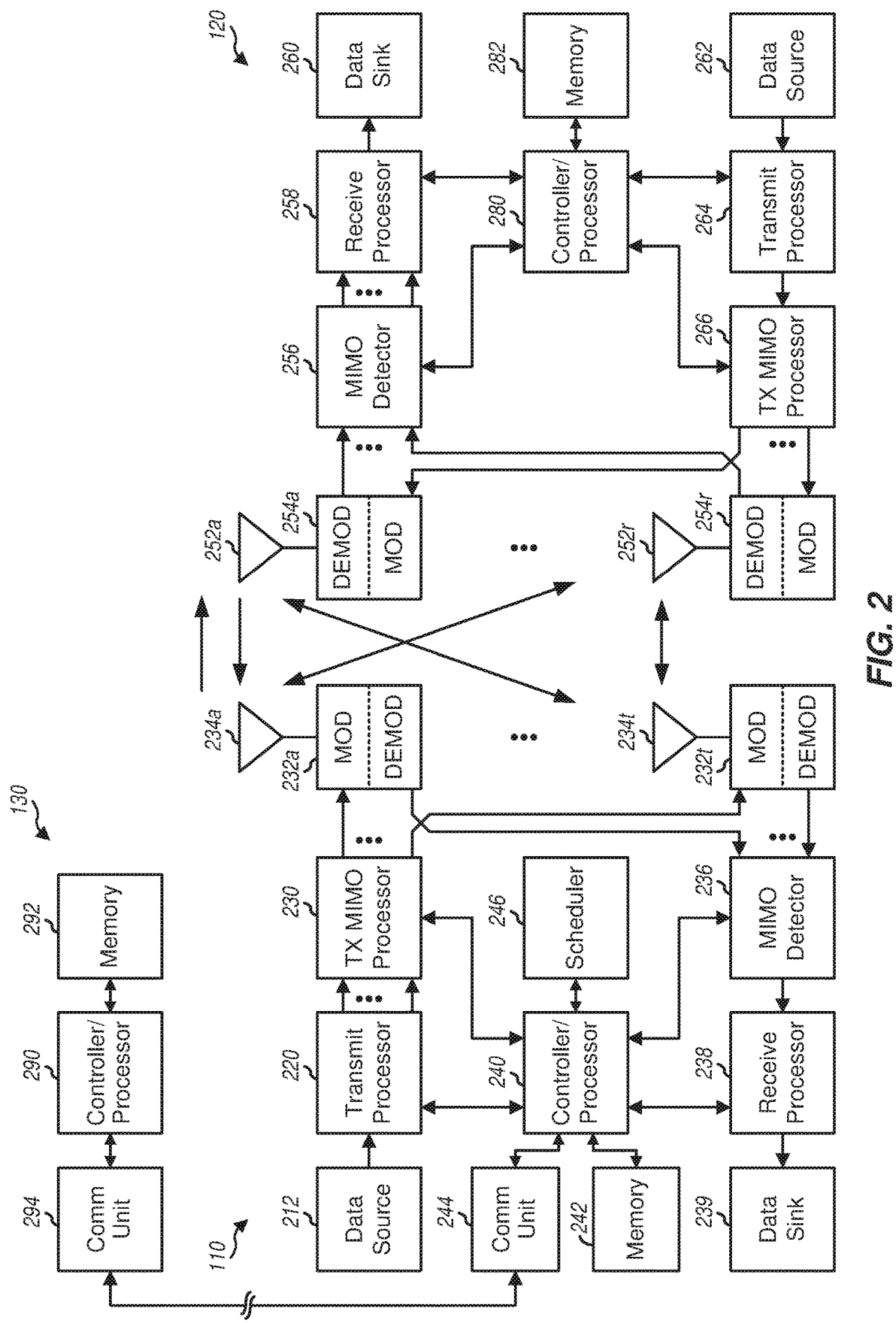
FIG. 2 is a block diagram conceptually illustrating an example of an evolved node B (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODS) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols, A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power(RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS and/or data in the resource blocks may be precoded using the same precoder. The power level used for UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
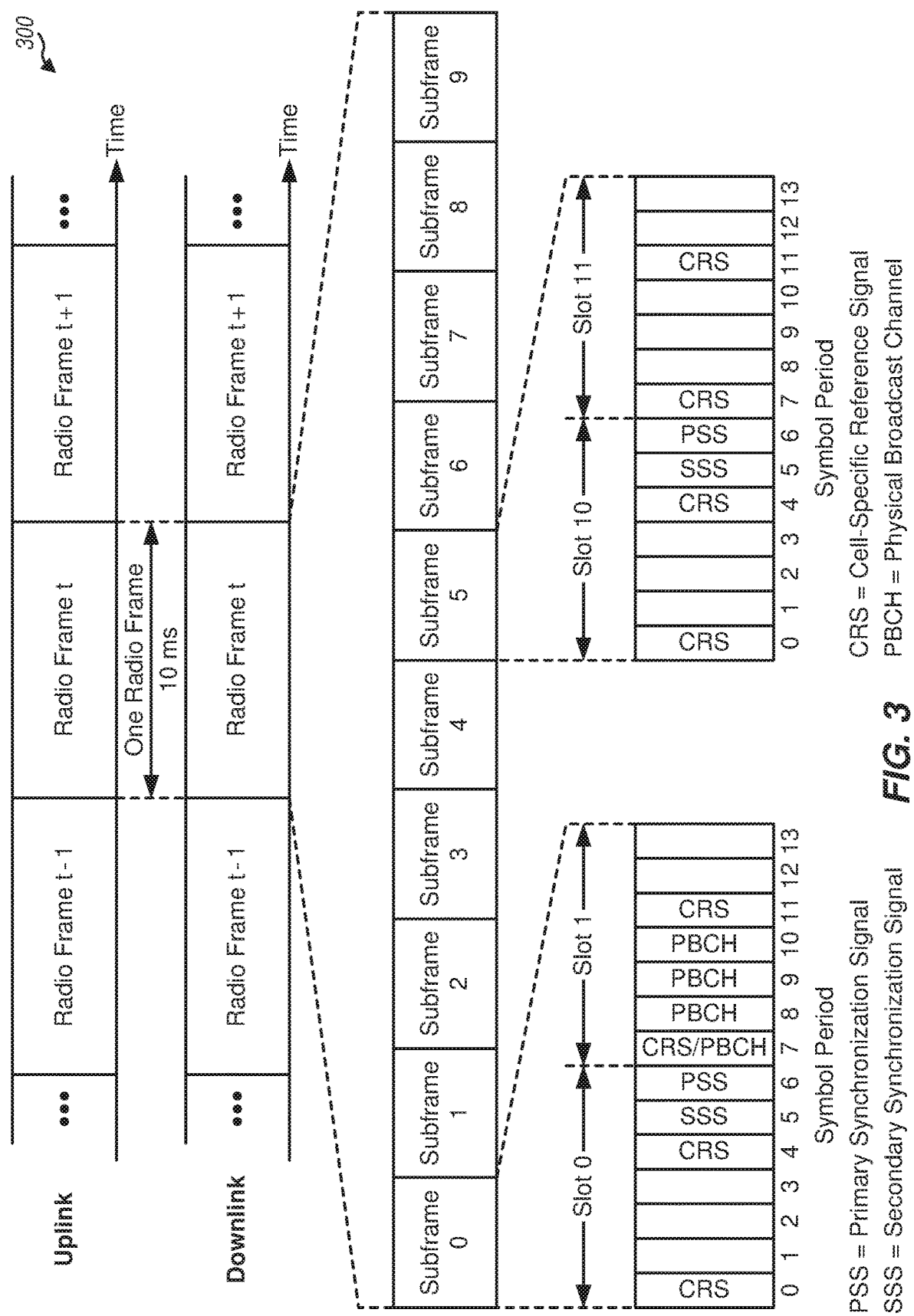
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2 L symbol periods in each subframe may be assigned indices of 0 through 2 L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
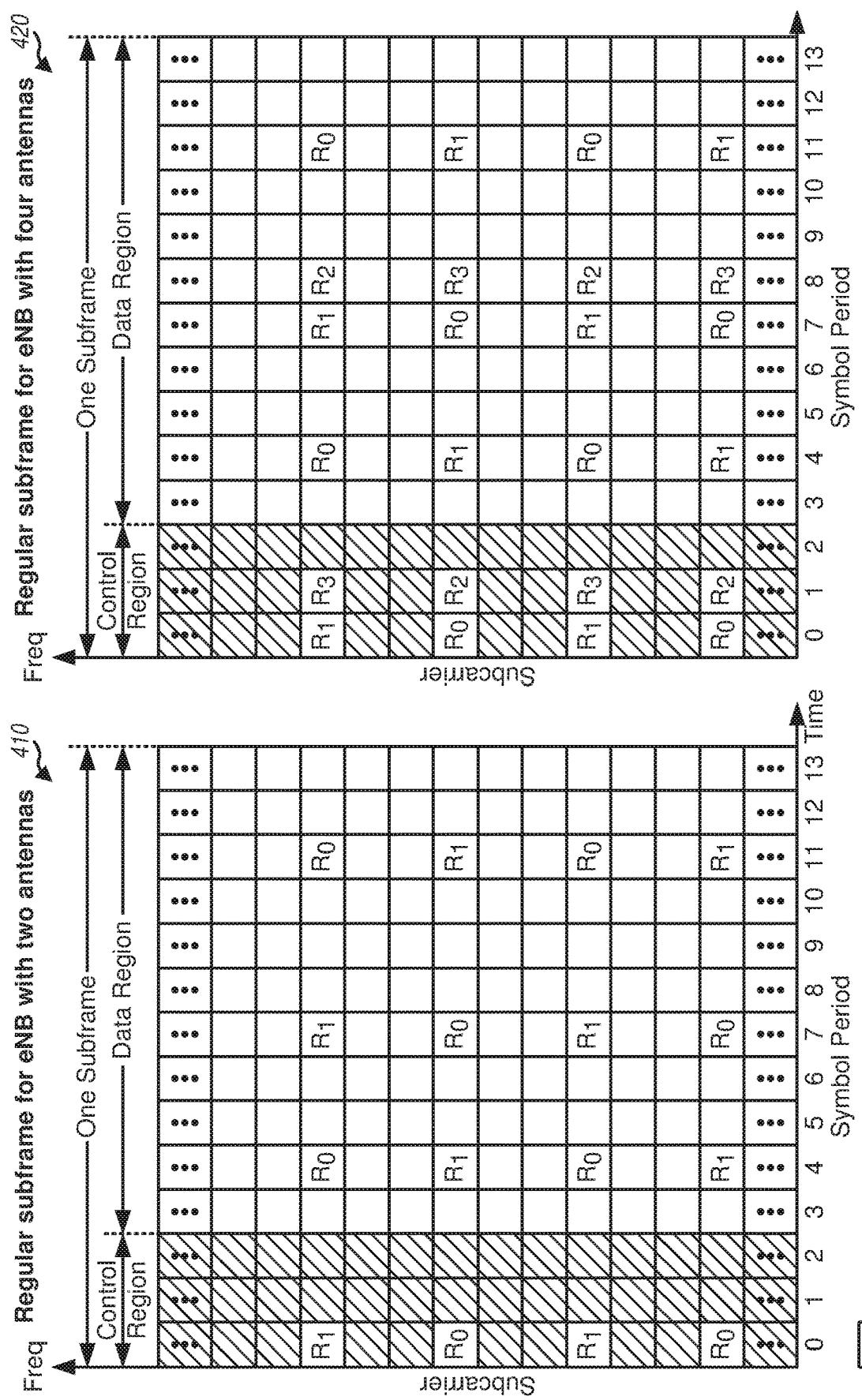
FIG. 4 illustrates example subframe formats for the downlink with a normal cyclic prefix (CP), in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

DMRS Enhancement for Higher Order MU-MIMO

Three-dimensional (3D) MIMO is specified in the 3GPP Rel-13 and has the potential of drastically enhancing Long Term Evolution (LTE) systems. 3D MIMO differs from conventional MIMO in that 3D MIMO supports the use of (1) a two-dimensional array with antenna ports on both horizontal and vertical axis and (2) a greater number of TXRU's (e.g., Transceiver Units) relative to conventional MIMO. A TXRU generally may control amplitude and phase independently of other TXRUs (e.g., via independent amplitude and phase control devices at each TXRU). Such capability together with the two-dimensional antenna array generally allows the transmitted signal to be steered bothonly in the horizontal direction, as in conventional multi-antenna systems, and simultaneously in both the horizontal and the vertical direction, providing more flexibility in shaping beam directions from eNB to UE.

Higher order multi-user multiple-input multiple-output (MU-MIMO) may enable wireless devices to fully exploit the degree of freedom in elevation dimension introduced by 3D-MIMO. To efficiently support higher order MU-MIMO, DMRS enhancement is needed to have orthogonal DMRS port multiplexing (e.g., using orthogonal DMRS port multiplexing) to reduce DMRS inter-layer interference and improve channel estimation performance.

There are two types of MU resource sharing that can be used with 3D-MIMO techniques and a two-dimensional (2D) antenna array. UEs may be separated in the horizontal direction only, or UEs may be separated in both vertical and horizontal directions. In such way, up to 8 UEs or 8-layer transmission in total is possible for 3D-MIMO with 64 antenna ports. For the support of higher order MU-MIMO, the design of downlink (DL) control signaling and DMRS allocation is needed.

Aspects of the present disclosure present several orthogonal DMRS patterns that can be used to support higher order MU-MIMO. Additionally, aspects of the present disclosure provide for transmission and reception of control signaling for a DMRS pattern and a port indication. The orthogonal DMRS patterns and signaling resented herein is backward compatible (e.g., with conventional devices that employ 2D-MIMO techniques for communications) and has minimum signaling overhead.

FIG. 5 illustrates an example of quasi-orthogonal demodulation reference signal (DMRS) structure 500, in accordance with certain aspects of the present disclosure. In the current specification, two orthogonal DMRS ports (e.g., ports 7 and 8 illustrated in FIG. 5) and two scrambling sequences (e.g., Id 0 and Id 1) are defined for MU-MIMO.

In the current specification, the quasi-orthogonal DMRS structure 500 supports no more than 4-layer transmission in total for MU-MEMO transmission, and no more than two layers per UE with two orthogonal DM-RS ports. As illustrated in FIG. 5, there is one code division multiplexing (CDM) group with orthogonal DMRS ports, and the CDM group may be multiplexed using a length-2 orthogonal cover code (OCC). In some cases, CDM groups may use different scrambling sequences (e.g., a first CDM group may use the scrambling sequence Id 0, and a second CDM group may use the scrambling sequence Id 1).

In some cases,virtual cell ID (VCID) may be used for DMRS sequence initialization to support more than 4-layer MU-MIMO. For example, VCID can be configured by radio resource control (RRC) signaling on per-UE basis. However, in such case, channel estimation performance may be degraded by interference between different DMRS layers because the orthogonality provided by different scrambling codes (or sequences) is weak. In general, orthogonal DMRS design is preferred over non-orthogonal DMRS design especially for higher order MU-MIMO. Therefore, higher-rank orthogonal DMRS patterns may be needed for 4-layer and 8-layer MU-MIMO.

Figure 6:
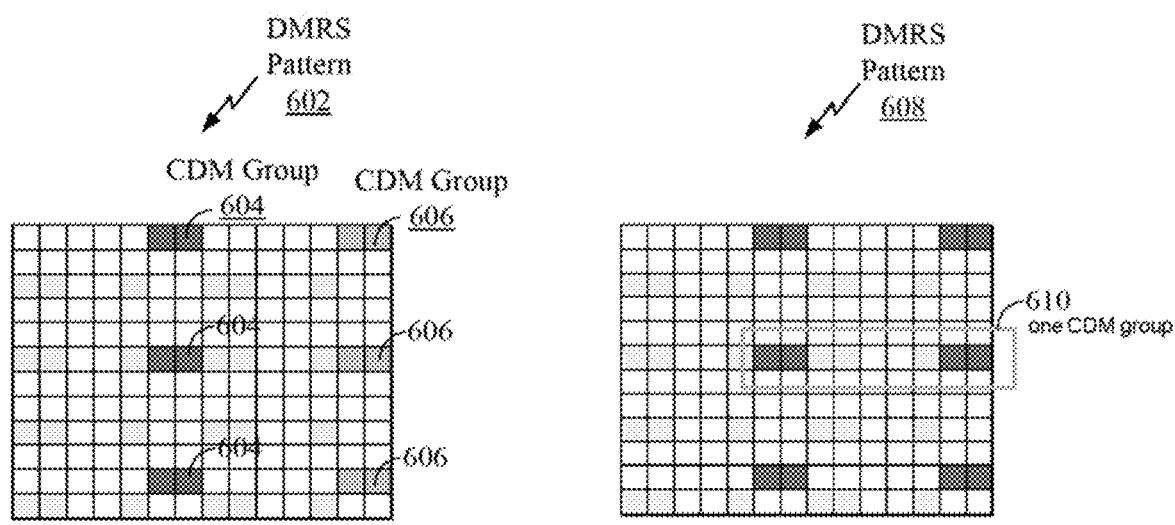
FIG. 6 illustrates example DMRS patterns for 4-layer multi-user multiple-input multiple-output (MU-MIMO) communications with a normal cyclic prefix (CP), in accordance with certain aspects of the present disclosure.

FIG. 6 illustrates example DMRS patterns for 4-layer MU-MIMO communications with a normal cyclic prefix (CP), in accordance with certain aspects of the present disclosure. For the support of 4-layer orthogonal MU-MIMO, the two options for DMRS pattern design (e.g., patterns 602 and 608) illustrated in FIG. 6 may be used.

As illustrated in FIG. 6, for the DMRS pattern 602, CDM and Time Division Multiplexing (TDM) is combined with a length-2 OCC. CDM group 604 may be allocated for layers {1,2} or DMRS ports {7,8}, and CDM group 606 may be allocated for layers {3,4} or DMRS ports {11,13}.TDM may be applied between the CDM group 604 and the CDM group 606.

For the DMRS pattern 608, there may be 12 resource elements (REs) per layer using a length-4 OCC. As illustrated in FIG. 6, for the DMRS pattern 608, CDM group 610 may span over 4 REs in time which are not contiguous. At high Doppler, the orthogonality may be lost, leading to performance loss. For the DMRS pattern 608, the CDM group 610 may be allocated for layers {1,2,3,4} or DMRS ports {7, 8, 11, 13} via length-4 OCC.

DMRS pattern 608 allows for the use of a uniform DMRS to PDSCH (Physical Downlink Shared Channel) power ratio for each layer. Compared to the DMRSpattern 608, 3 dB DMRS power boosting may need to be used for the DMRS pattern 602 due to TDM of two CDM groups.

Figure 7:
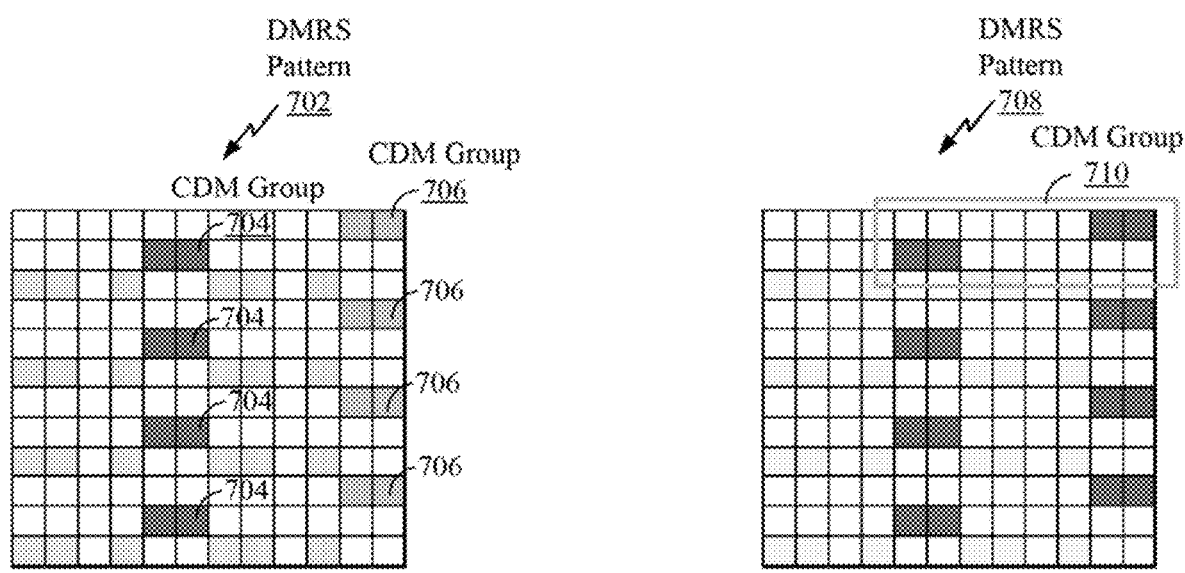
FIG. 7 illustrates example DMRS patterns for 4-layer MU-MIMO communications with an extended CP, in accordance with certain aspects of the present disclosure.

FIG. 7 illustrates examples DMRS patterns for 4-layer MU-MIMO communications with an extended cyclic prefix (CP), in accordance with certain aspects of the present disclosure. As illustrated in FIG. 7, for the DMRS pattern 702, CDM and TDM may be combined with length-2 OCC. For the DMRS pattern 702, CDM group 704 may be allocated for layers 1 and 2, and CDM group 706 may be allocated for layers 3 and 4. TDM may be applied between the CDM group 704 and the CDM group 706. For the DMRS pattern 708, there may be 12 RE per layer with length-4 OCC. For the DMRS pattern 708, a single CDM group 710 may be allocated for layers {1,2,3,4} via length-4 OCC. In some aspects, orthogonal TDM and FDM may be applied between CDM group 704 and CDM group 706.

Figure 8:
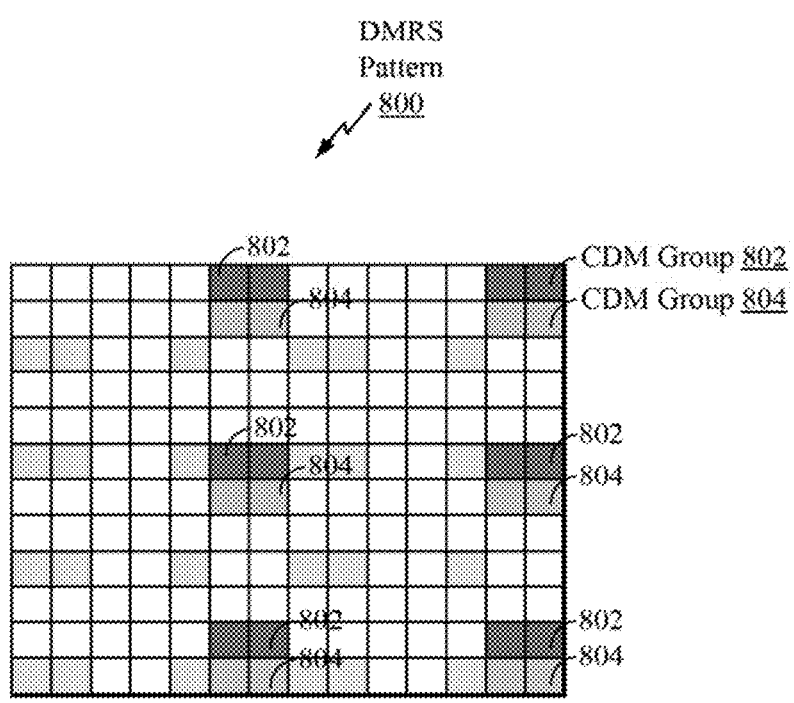
FIG. 8 illustrates an example DMRS pattern for 8-layer MU-MIMO, in accordance with certain aspects of the present disclosure.

FIG. 8 illustrates an example DMRS pattern 800 for 8-layer MU-MIMO with a normal CP, in accordance with certain aspects of the present disclosure. As illustrated in FIG. 8, if eight UEs or total 8-layer MU-MIMO is supported, the orthogonal DMRS pattern can be extended by combining CDM and Frequency Division Multiplexing (FDM) with length-4 OCC. In some aspects, 4-layers may be multiplexed using a length-4 OCC, and 2 CDM groups may be further multiplexed in the frequency domain. From a UE perspective, the DMRS pattern may use 12 DMRS REs for demodulation of PDSCH, but the DMRS location may be determined by the CDM group. As illustrated in FIG. 8, CDM group 802 may be allocated for layers {1,2,3,4} or DMRS ports {7,8,11,13}, and CDM group 804 may be allocated for layers {5,6,7,8} or DMRS ports {9,10,12,14}. Orthogonal TDM and/or FDM may be applied between the CDM group 802 and the CDM group 804.

In some aspects, a first CDM group and a second CDM group may be non-orthogonally multiplexed on the same resource elements in the time and frequency domains The first CDM group may use a first scrambling sequence, and a second CDM group may use a second scrambling sequence DL Control Signaling for DMRS Pattern and Port Indication DMRS patterns (e.g., legacy 2-layer with length-2 OCC or enhanced 4-layer or 8-layer orthogonal pattern with length-4 OCC) can be semi-statically configured by RRC or via dynamic L1 signaling on the PDCCH for each UE. For example, two bit signaling for DMRS pattern indication may be utilized. The pattern "00" may indicate a legacy quasi-orthogonal DMRS with length-2 OCC; the pattern "01" may indicate one enhanced 4-layer DMRS pattern of either CDM+TDM via length-2 OCC or CDM only via length-4 OCC; and the patterns "10" and "11" may indicate an enhanced 8-layer DMRS pattern of CDM group 1 and 2 (e.g., the CDM groups 802 and 804 in FIG. 8).

The DMRS overhead for each configured DMRS pattern may be different, which may result in different rate matching pattern for PDSCH resource mapping. For example, if 8-layer DMRS pattern is indicated, then the UE may use 24

DMRS REs for PDSCH rate matching instead of 12 REs. The dynamic configuration of the DMRS pattern may allow the network to dynamically switch between different DMRS patterns on a per-UE basis based on mobility (e.g., the speed of the UE) and the capability of the UE to support higher order MU-MIMO.

In some cases, the enhanced DMRS patterns described herein may be applicable only for PDCCH/EPDCCH (Enhanced PDCCH) located in a UE specific search space. For example, for (E)PDCCH in a common search space, the legacy 2-layer DMRS pattern via length-2 OCC may be used even if UE is configured with an enhanced DMRS pattern by RRC signaling. Using a legacy DMRS pattern in a common search space provides for backward compatibility with legacy UEs that may not support enhanced DMRS patterns and allows UEs that support enhanced DMRS patterns to coexist with legacy UEs.

FIG. 9 illustrates examples of DL control signaling for DMRS pattern and port indication, in accordance with certain aspects of the present disclosure. For DMRS port indication, the existing 3-bits field in Downlink Control information (DCI) format can be reused, but the content may be determined by the configured DMRS pattern. For example, UE may use the table 902 to determine DMRS port and number of layers indication if the legacy DMRS pattern is configured. The table 904 may be used for the enhanced 4-layer or the CDM group 1 (e.g., the CDM group 802 in FIG. 8) of the 8-layer DMRS pattern.

The difference between tables 902 and 904 is that a quasi-orthogonal DMRS(e.g., scrambling ID=0/1) may be used in the table 902, while orthogonal DMRS ports may be assumed in the table 904. As illustrated in FIG. 9, the table 902 provides antenna port(s), scrambling identity and number of layers indication for legacy MU DMRS pattern; the table 904 provides antenna port(s) and number of layers indication for enhanced MU DMRS pattern.

According to some aspects of the present disclosure, joint indication of the DMRS pattern and antenna port indices may be transmitted to each UE via L1 control signaling. For example, one bit may be used for PDSCH rate matching indication (e.g., to indicate the use of 12 or 24 DMRS REs), and another 4 bits may be used for DMRS pattern and port indication.

Examples of joint coding of DMRS pattern and port indication are illustrated in the table 1000 from FIG. 10 and by the table 1100 from FIG. 11. FIG. 10 illustrates examples of joint DMRS pattern and port indication with one codeword enabled, in accordance with certain aspects of the present disclosure. FIG. 11 illustrates examples of joint DMRS pattern and port indication with two codewords enabled, in accordance with certain aspects of the present disclosure. For example, for joint DMRS and port indication using one codeword, there are 8 MU states corresponding to 8 orthogonal DMRS ports of rank 1, as illustrated in the table 1000 in FIG. 10. For joint DMRS and port indication using two codewords, there are 6 MU states corresponding to four rank-2 cases, one rank-3 case and one rank-4 case, as illustrated in the table 1100 in FIG. 11. In some aspects, based on the port indication, UE may know the assigned DMRS ports, total DRMS resources, and maximum number of orthogonal DRMS ports for MU.

DRMS to OCC Mapping

For OCC (orthogonal cover code) mapping for DMRS ports {7,8,9,10}, the current method can be reused for backward compatibility. For example, an OCC design may be based on length-2 Walsh code (1 1) for ports 7 and 9 and the length-2 Walsh code (1 −1) for ports 8 and 10, or length-4 Walsh codes of (1, 1, 1, 1) and (1 −1 1 −1). In some aspects, 2D orthogonal mapping may be achieved by reversing the mapping direction every subcarrier.

In some aspects, for DMRS ports {11, 13, 12, 14}, it may be possible to reuse the OCC and mapping pattern for ranks 5-8 of SU-MIMO. For example, length-4 Walsh codes {1, 1, −1, −1} and {1, −1, −1, 1} can be used for ports 11 and 13, and length-4 Walsh codes {−1, −1, 1, 1} and {−1, 1, 1, −1} can be used for ports 12 and 14. However, if only DMRS ports 7 and 11 are configured using sequences {1, 1, 1, 1} and {1, 1, −1, −1}, then, at high Doppler, there is a strong inter-layer interference due to the loss of the orthogonality since the CDM is over 4 REs in time that are not contiguous.

Similar inter-layer interference may also be observed for DMRS ports {8, 13}, {9, 12}, or {10, 14}. It should be noted that for DMRS ports {7, 13} or {8, 11}, there is no such problem since two sequences {1, 1, 1, 1} and {1, −1, −1, 1} or {1, −1, 1, −1} and {1, 1, −1, −1} are also orthogonal with CDM length-2.

To minimize the inter-layer interference of DMRS ports, one approach may include adding the layer shift in the frequency domain so that the OCC for DMRS port {11, 13, 12, 14} is switched on frequency domain between two spreading sequences, where the second spreading sequence is a cyclically shifted version of the first spreading sequence. For example, for DMRS port 11, frequency switching may be performed between spreading sequence {1, 1, −1, −1} and spreading sequence {1, −1, −1, 1}.

Figure 12:
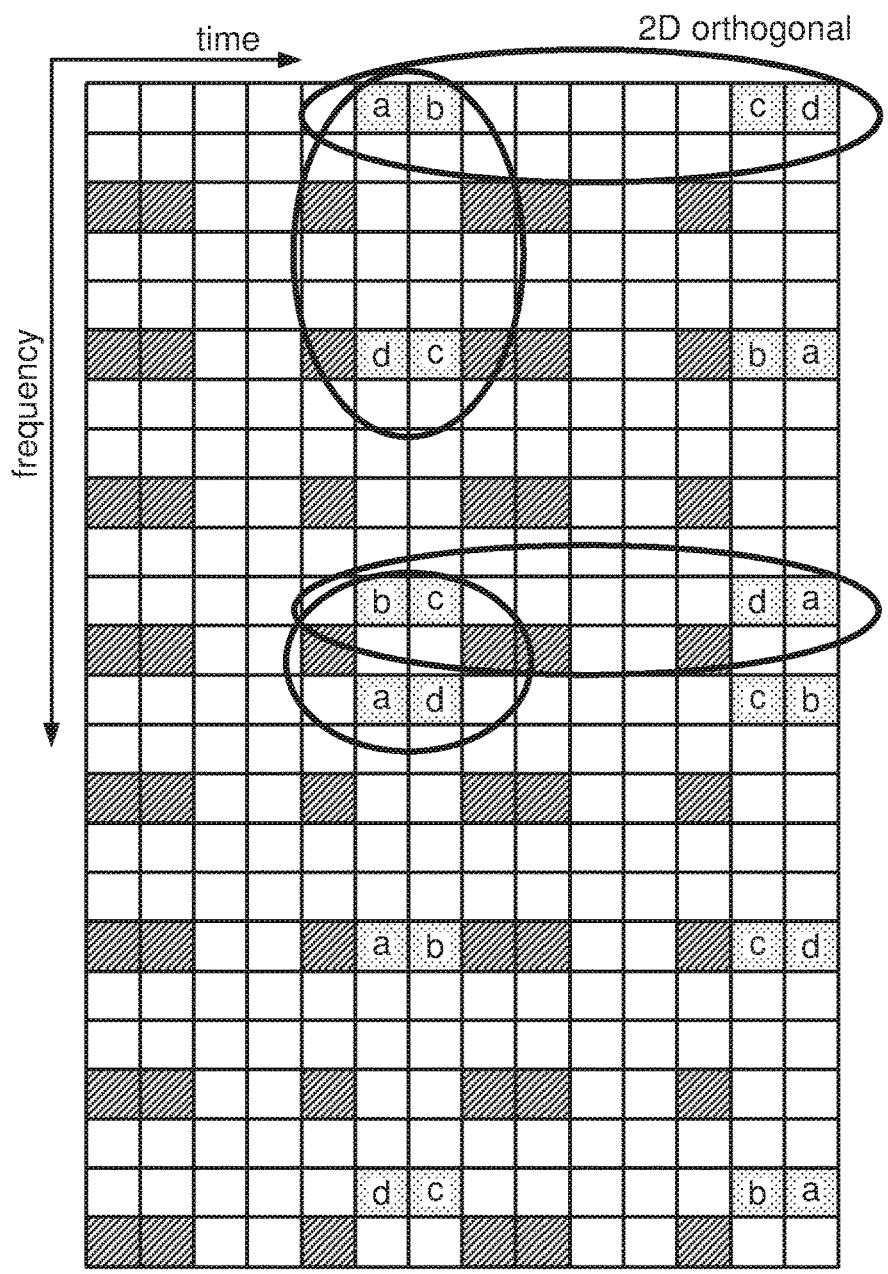
FIG. 12 illustrates examples of DMRS to orthogonal cover code (OCC) mapping, in accordance with certain aspects of the present disclosure.

FIG. 12 illustrates examples of DMRS to OCC mapping for DMRS ports {11, 12, 13, 14}, in accordance with certain aspects of the present disclosure. In order to retain frequency orthogonality, the reserving mapping direction may also be used for the $2^{nd}$ and $4^{th}$ subcarrier, resulting in total four spreading sequences for each DMRS port. As illustrated in FIG. 12, the $2^{nd}$ spreading sequence {d, c, b, a} may be a time reversal version of the first spreading sequence {a, b, c, d}; the $3^{rd}$ spreading sequence {b, c, d, a} may be a left cyclic shift version of the $1^{st}$ spreading sequence; and the $4^{th}$ spreading sequence {a, d, c, b} may be a time reversal version of the $3^{rd}$ spreading sequence or a right cyclic shift version of the $2^{nd}$ spreading sequence.

PRB Bundling

Figure 13:
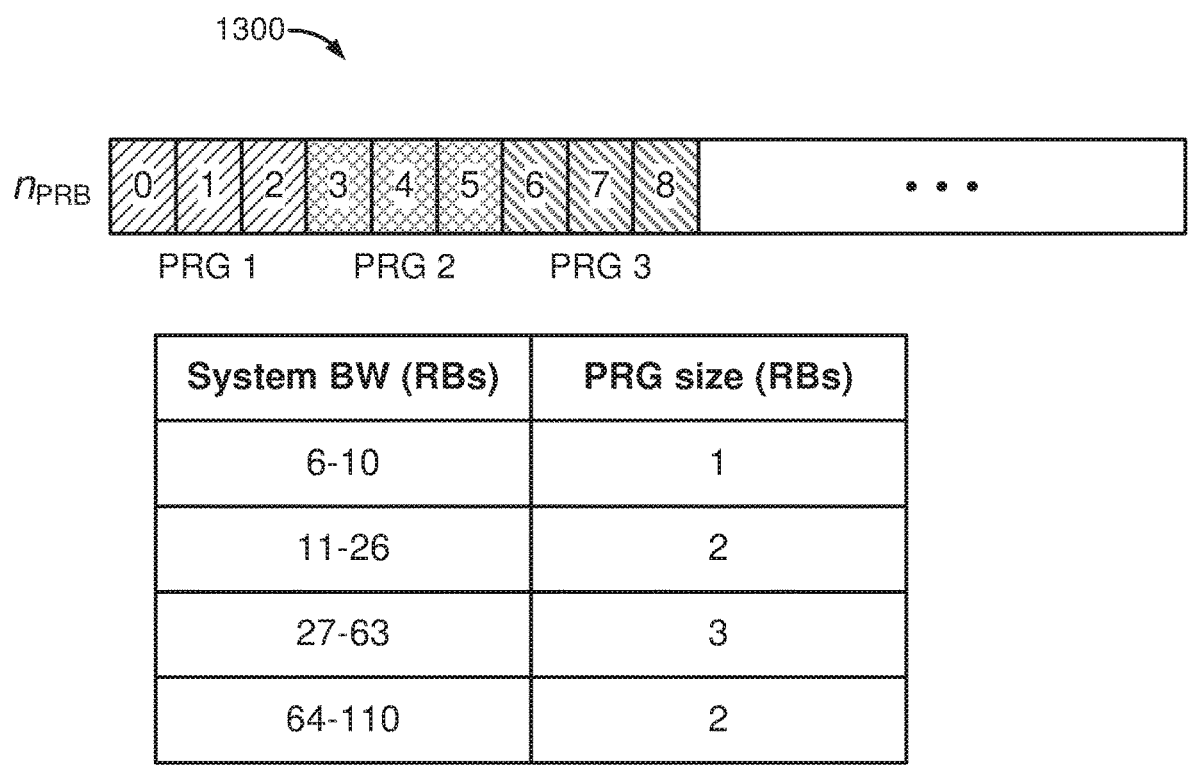
FIG. 13 illustrates an example of precoding resource block (PRB) bundling, in accordance with certain aspects of the present disclosure.

FIG. 13 illustrates an example 1300 of precoding resource block (PRB) bundling, in accordance with certain aspects of the present disclosure. PRB bundling may be used when Pre-coding Matrix Indicator/Rank Indicator (PMI/RI) feedback is configured so that UE can assume the same precoder is applied in multiple PRBs. The precoding RB groups (PRGs) may be fixed and comprise consecutive PRBs. The boundary may be cell specific independent of UE allocation. PRB bundling can improve the channel estimation performance by using joint channel estimation across the PRGs.

For MU-MIMO, there is one problem about RB bundling assumption for the co-scheduled UE, especially when more than two orthogonal ports are supported. A simple solution can be that UE assumes no bundling for co-scheduled UEs since there could be different UE pairing in the PRGs. This is a straightforward solution, as assuming no bundling for co-scheduled UEs may not impose restrictions on eNB scheduling. However, frequency orthogonality of OCC mapping may not be valid across the PRB since the precoder for interfering layers may change over RBs in one PRG. This may degrade the channel estimation performance for edge tones when frequency orthogonality (e.g., frequency OCC dispreading) is used for channel estimation (e.g., at high Doppler).

Figure 14:
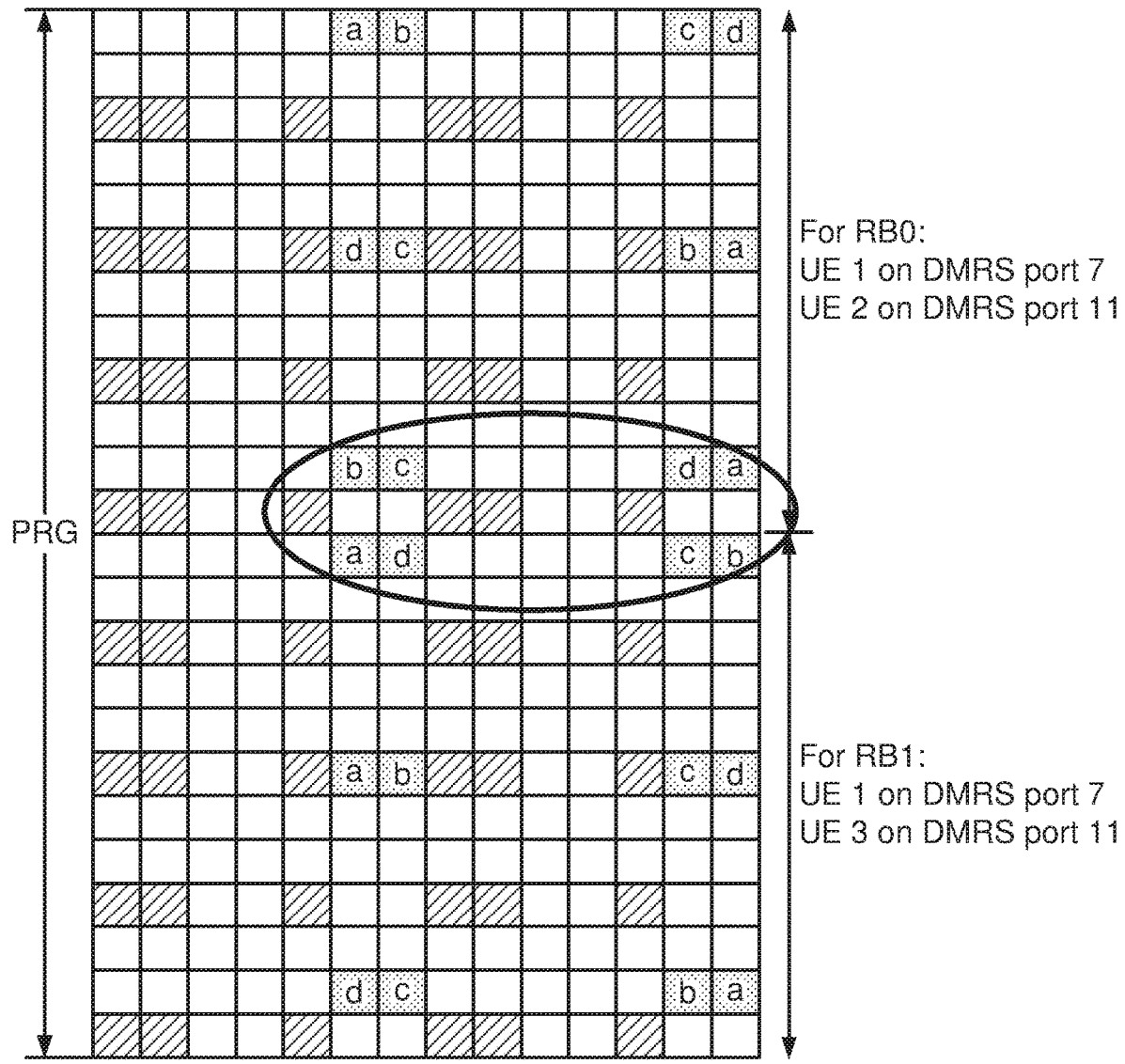
FIG. 14 illustrates an example of PRB bundling with two RBs in one precoding RB group (PRG), in accordance with certain aspects of the present disclosure.

FIG. 14 illustrates an example of PRB bundling 1400 with two RBs in one precoding RB group (PRG), in accordance with certain aspects of the present disclosure. As illustrated in FIG. 14, one PRG with 2 PRBs is considered, with different UE pairings on RBs 0 and 1. In this case, for channel estimation of edge tones across the two RBs, frequency OCC dispreading cannot be used since different precoders are generally used for DMRS port 11 between RB 0 and RB1, resulting in a loss of frequency orthogonality.

Aspects of the present disclosure provide certain assumptions for PRB bundling for other orthogonal ports assigned to the co-scheduled UEs. In an aspect of the present disclosure, UEs may assume the use of the same bundling boundary for the co-scheduled. UEs. For example, UEs may assume that the bundling boundaries are fixed and dependent on system bandwidth, such as bundling boundaries of 2/3/2 RBs for 5/10/20 MHz. Assuming the use of the same bundling boundary for co-scheduled UEs may add scheduling constraints since it is assumed the same UE pairing is applied to the bundled RBs of the PRG. In another aspect, UE may use a bundling boundary configured using higher level signaling, such as two RB boundaries for both the used DMRS ports and other DMRS ports of the co-scheduled UEs. This approach may achieve a tradeoff between channel estimation performance and scheduling constraints and may provide more flexibility for eNB implementation.

Figure 15:
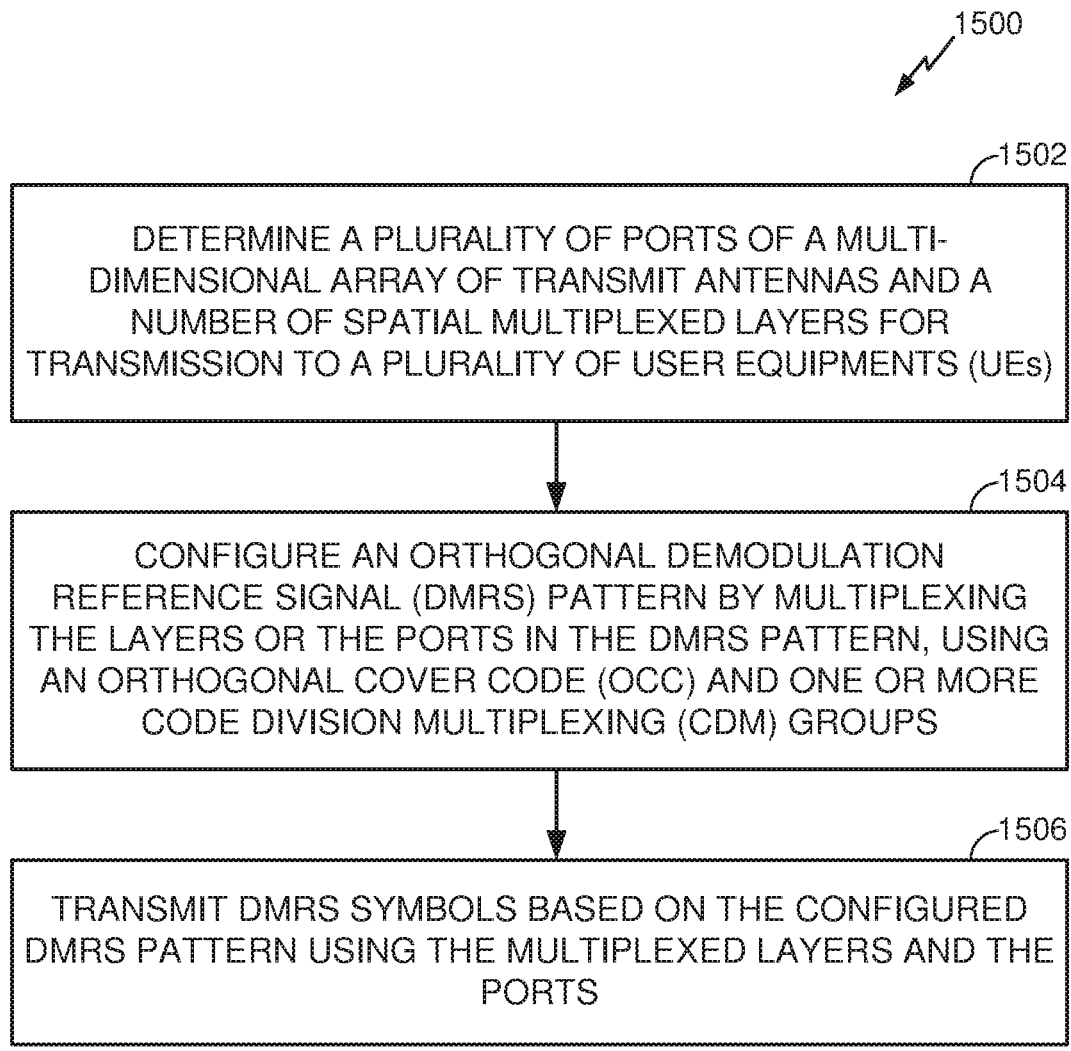
FIG. 15 illustrates example operations that may be performed at an evolved Node B (eNB) for transmitting a DMRS to a plurality of UEs, in accordance with certain aspects of the present disclosure.

FIG. 15 illustrates example operations 1500 that may be performed at an evolved Node B (eNB) or a base station (BS), in accordance with certain aspects of the present disclosure. Operations 1500 may be executed, for example, at the processor(s) 240, 230, and/or 238 of the eNB 110 from FIG. 2. While operations 1500 and other aspects of the present disclosure are described with reference to LTE-A systems, the techniques described herein are applicable to any other suitable MIMO system.

Operations 1500 may begin, at 1502, by determining a plurality of ports of a multi-dimensional array of transmit antennas and a number of spatial multiplexed layers for transmission to a plurality of user equipments (UEs). At 1504, an orthogonal demodulation reference signal (DMRS) pattern may be configured by multiplexing the layers or the ports in the DMRS pattern, using an orthogonal cover code (OCC) and one or more code division multiplexing (CDM) groups. At 1506, DMRS symbols may be transmitted based on the configured DMRS pattern using the multiplexed layers and the ports.

In an aspect of the present disclosure, as discussed above (e.g., the DMRS pattern 602 in FIG. 6), the OCC may comprise a length-2 OCC. The one or more CDM groups may comprise a first CDM group allocated to a first pair of layers or a first pair of ports and a second CDM group allocated to a second pair of layers or a second pair of ports, and TDM may be applied between the first CDM group and the second CDM group. In another aspect (e.g., the DMRS pattern 702 in FIG. 7), the OCC may comprise a length-2 OCC. The one or more CDM groups may comprise a first CDM group allocated to a first pair of layers and a second CDM group allocated to a second pair of layers. TDM may be applied between the first CDM group and the second CDM group, and the first CDM group may be shifted in frequency relative to the second CDM group.

In yet another aspect, as discussed above (e.g., the DMRS pattern 608 in FIG. 6), the OCC may comprise a length-4 OCC, and the one or more CDM groups may comprise a single CDM group allocated to four layers or four ports spanning four noncontiguous resource elements (REs) in the time domain. In yet another aspect (e.g., the DMRS pattern 708 in FIG. 7), the OCC may comprise a length-4 OCC. The one or more CDM groups may comprise a single CDM group allocated to four layers spanning four noncontiguous resource elements (REs) in time domain, and two of the four REs may be frequency shifted relative to other two of the four REs.

In yet another aspect, as discussed above (e.g., the DMRS pattern 800 in FIG. 8), the OCC may comprise a length-4 OCC. The one or more CDM groups may comprise a first CDM group allocated to a first set of four layers or four ports spanning four noncontiguous resource elements (REs) in time domain and a second CDM group allocated to a second set of four layers or four ports spanning four noncontiguous REs in time domain. Frequency division multiplexing (FDM) may be applied between the first CDM group and the second CDM group.

In an aspect of the present disclosure, the BS may provide an indication about the configured DMRS pattern to the plurality of UEs using radio resource control (RRC) signaling. In another aspect, the BS may provide an indication about the configured DMRS pattern to the plurality of UEs using dynamic L1 signaling on a Physical Downlink Control Channel (PDCCH) for each UE. In some cases, the indication about the configured DMRS pattern may include first data indicating a type of multiplexing used for a first and a second CDM group, and second data indicating a length of the OCC (e.g., whether the DMRS pattern uses a length-2 OCC or a length-4 OCC).

In some aspects, as discussed above, the configured DMRS pattern may be dynamically switched based, for example, on the speed of a user equipment (UE) of the plurality of UEs or a UE capability to support higher order multi-user multiple-input multiple-output (MU-MIMO) communications. In an aspect, the BS may communicate an indication about the ports of the multi-dimensional array of transmit antennas and the number of layers for transmitting the DMRS symbols using L1 control signaling on a Physical Downlink Control Channel (PDCCH).

In some aspects, as discussed above, the BS may communicate a joint indication of the configured DMRS pattern and the ports of the multi-dimensional array of transmit antennas using L1 control signaling. For example, the joint indication may comprise one bit for Physical Downlink Shared Channel (PDSCH) rate matching information and four bits indicating the configured DMRS pattern and the ports of the multi-dimensional array of transmit antennas.

In some aspects, as discussed above, the OCC may comprise a length-4 Walsh code indicated by the sequence {a, b, c, d}, and switching may be performed in the frequency domain between the OCC and a second OCC. The second OCC may be is a cyclic shift version of the length-4 Walsh code. For example, the second OCC may comprise a length-4 Walsh code indicated by the sequence {b, c, d, a}.

In some aspects, as discussed above (e.g., the DMRS pattern illustrated in FIG. 12), the OCC may be used for a first subcarrier of the DMRS pattern. A second OCC, which may be a time reversal version of the OCC, may be used for a second subcarrier of the DMRS pattern. A third OCC, which may be a left cyclic shift of the OCC, may be used for a third subcarrier of the DMRS pattern. Finally, a fourth OCC, which may be a right cyclic shift of the OCC, may be used for a fourth subcarrier of the DMRS pattern. For example, as illustrated in FIG. 12, the OCC may comprise a length-4 Walsh code indicated by the sequence {a, b, c, d}, the second OCC may comprise a length-4 Walsh code indicated by the sequence {d, c, b, a}, the third OCC may comprise a length-4 Walsh code indicated by the sequence {b, c, d, a}, and the fourth OCC may comprise a length-4 Walsh code indicated by the sequence {a, d, c, b}.

In some aspects, the BS may schedule some UEs of the plurality of UEs for a plurality of bundled resource blocks (RBs) used for transmitting the DMRS symbols. The same precoder may be applied, at the BS, to the plurality of bundled RBs. The BS may provide, to the co-scheduled UEs, indication about a size of the plurality of bundled RBs.

Figure 16:
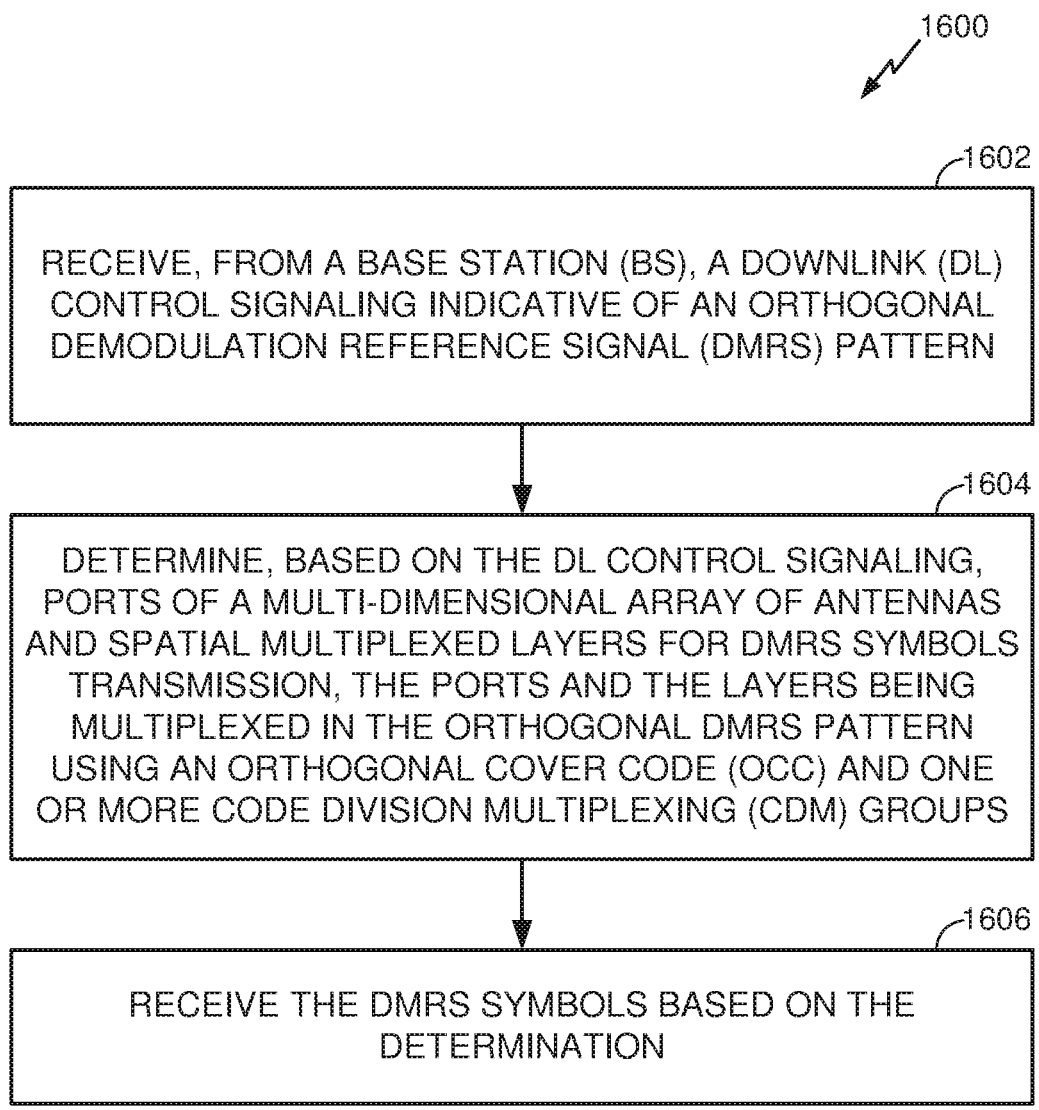
FIG. 16 illustrates example operations that may be performed at a user equipment (UE) to process a DMRS received from an eNB, in accordance with certain aspects of the present disclosure.

FIG. 16 illustrates example operations 1600 that may be performed at a user equipment (UE), in accordance with certain aspects of the present disclosure. These operations 1600 may be executed, for example, at the processor(s) 258, 280, and/or 264 of the UE 120 from FIG. 2. While operations 1600 and other aspects of the present disclosure are described with reference to LTE-A systems, the techniques described herein are applicable to any other suitable MIMO system.

Operations 1600 may begin at 1602, where a UE receives, from a base station (BS), a downlink (DL) control signaling indicative of an orthogonal demodulation reference signal (DMRS) pattern. At 1604, the UE may determine, based on the DL control signaling, ports of a multi-dimensional array of antennas and spatial multiplexed layers for DMRS symbols transmission, the ports and the layers being multiplexed in the orthogonal DMRS pattern using an orthogonal cover code (OCC) and one or more code division multiplexing (CDM) groups. At 1606, the UE may receive the DMRS symbols based on the determination.

In an aspect of the present disclosure, the UE may receive an indication about the DMRS pattern via radio resource control (RRC) signaling. In another aspect, the UE may receive an indication about the DMRS pattern via dynamic L1 signaling on a Physical Downlink Control Channel (PDCCH). In yet another aspect, the UE may receive an indication about the ports of the multi-dimensional array of antennas and the number of layers for transmitting the DMRS symbols using L1 control signaling on a Physical Downlink Control Channel (PDCCH).

In some aspects, the UE may receive joint indication of the DMRS pattern and the ports of the multi-dimensional array of antennas using L1 control signaling. In an aspect, the joint indication may comprise one bit for Physical Downlink Shared Channel (PDSCH) rate matching information and four bits indicating the configured DMRS pattern and the ports of the multi-dimensional array of transmit antennas.

In an aspect, the UE may process, based on the same bundling boundary for co-scheduled user equipments (UEs), the DMRS symbols received within a plurality of bundled resource blocks (RBs). The same precoder may have been used for each port within the plurality of bundled RBs. In another aspect, the UE may process, based on a higher layer configured bundling boundary, the DMRS symbols received in a plurality of bundled resource blocks (RBs). The same precoder may have been used for each port within the plurality of bundled RBs.

Figure 15A:
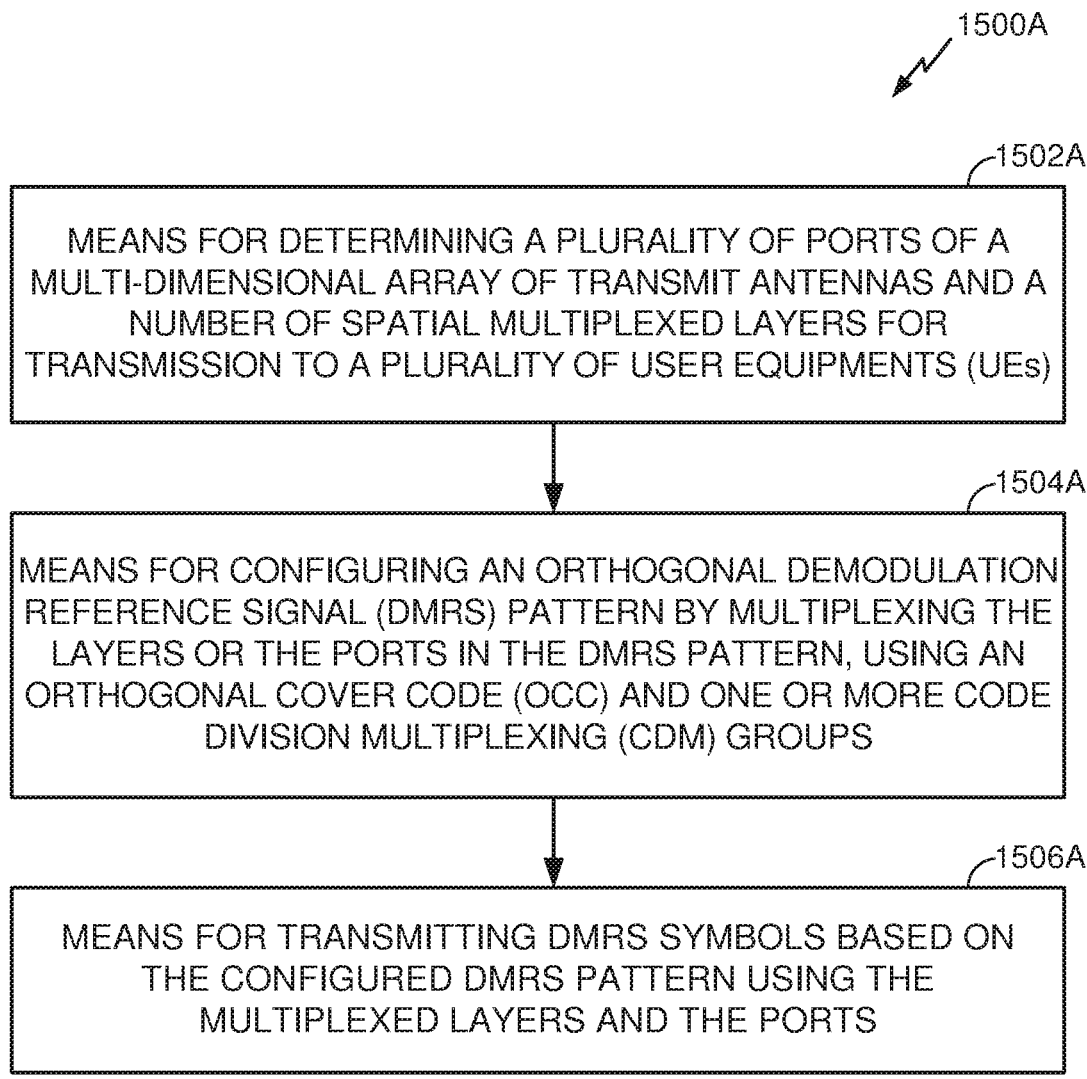
FIG. 15A illustrates example means capable of performing the operations shown in FIG. 15.
Figure 16A:
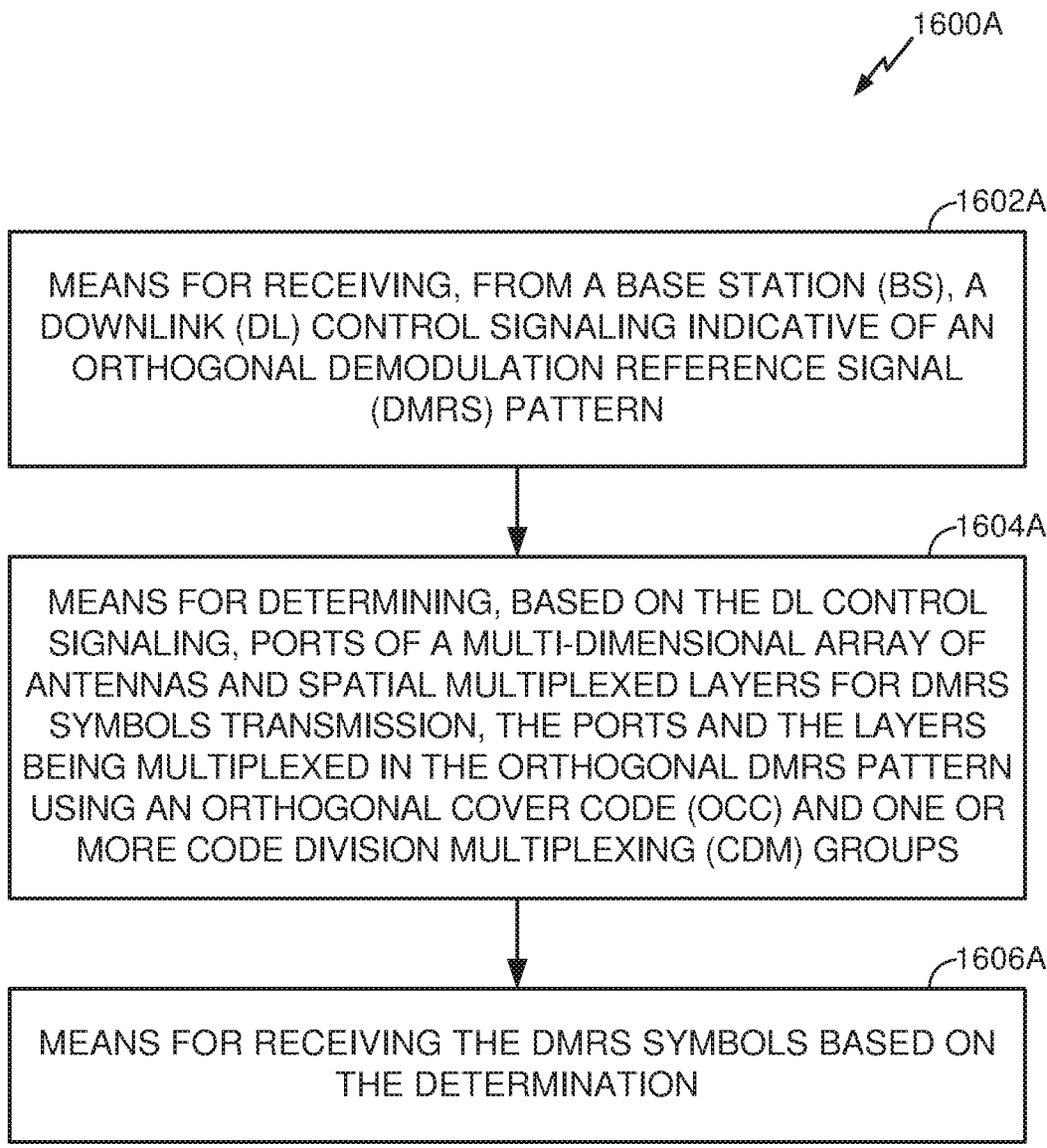
FIG. 16A illustrates example means capable of performing the operations shown in FIG. 16.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1500 and 1600 illustrated in FIG. 15 and FIG. 16 correspond to means 1500A and 1600A illustrated in FIG. 15A and FIG. 16A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
    determining a plurality of ports of a multi-dimensional array of transmit antennas and a number of spatial multiplexed layers for transmission to a plurality of user equipments (UEs);
    configuring a demodulation reference signal (DMRS) pattern by multiplexing one or both of the layers and the ports in the DMRS pattern using an orthogonal cover code (OCC) and one or more code division multiplexing (CDM) groups;
    providing, to the plurality of UEs, an indication about the configured DMRS pattern using radio resource control (RRC) signaling, wherein the indication comprises multiple bits, wherein a value of the multiple bit indication indicates whether the configured DMRS pattern is a legacy DMRS pattern or a non-legacy DMRS pattern, and wherein the indication identifies at least the ports in the DMRS pattern; and
    transmitting DMRS symbols based on the configured DMRS pattern using the multiplexed layers and the ports.

2. The method of claim 1, wherein:
    the OCC comprises a length-2 OCC;
    the one or more CDM groups comprise a first CDM group allocated to a first pair of layers or a first pair of ports, and a second CDM group allocated to a second pair of layers or a second pair of ports;
    the first CDM group and the second CDM group are non-orthogonally multiplexed on same resource elements in time and frequency domain; and
    the first CDM group uses a different scrambling sequence than the second CDM group.

3. The method of claim 1, wherein:
    the OCC comprises a length-2 OCC;
    the one or more CDM groups comprise a first CDM group allocated to a first pair of layers or a first pair of ports, and a second CDM group allocated to a second pair of layers or a second pair of ports; and
    orthogonal time division multiplexing (TDM) and frequency division multiplexing (FDM) is applied between the first CDM group and the second CDM group.

4. The method of claim 1, wherein:
    the OCC comprises a length-4 OCC, and
    the one or more CDM groups comprise a single CDM group allocated to four layers or four ports spanning four noncontiguous resource elements (REs) in time domain.

5. The method of claim 1, wherein:
    the OCC comprises a length-4 OCC,
    the one or more CDM groups comprise:
        a first CDM group allocated to a first set of four layers or four ports spanning four noncontiguous resource elements (REs) in time domain, and
        a second CDM group allocated to a second set of four layers or four ports spanning the four noncontiguous REs in time domain; and
    the first CDM group and second CDM group are non-orthogonal multiplexed on same resource elements in time and frequency domain, wherein the first CDM group uses a first scrambling sequence and the second CDM group uses a second scrambling sequence.

6. The method of claim 1, wherein the indication comprises:
    first data indicating a type of multiplexing used for a first and a second CDM group; and
    second data indicating a length of the OCC.

7. The method of claim 1, further comprising:
    dynamically switching the configured DMRS pattern based on a speed of a user equipment (UE) of the plurality of UEs or capability of the UE to support higher order multi-user multiple-input multiple-output (MU-MIMO) communications.

8. The method of claim 1, further comprising:
    communicating indication about the ports of the multi-dimensional array of transmit antennas and the number of layers for transmitting the DMRS symbols using L1 control signaling on a Physical Downlink Control Channel (PDCCH).

9. The method of claim 1, further comprising:
    communicating a joint indication of the configured DMRS pattern and the ports of the multi-dimensional array of transmit antennas using L1 control signaling.

10. The method of claim 9, wherein:
    the joint indication comprises one bit for Physical Downlink Shared Channel (PDSCH) rate matching indication and four bits indicating the configured DMRS pattern and the ports of the multi-dimensional array of transmit antennas.

11. The method of claim 1, wherein:
    the OCC comprises a length-4 Walsh code indicated by a sequence {a, b, c, d}, and the method further comprises switching, on frequency domain, between the OCC and another OCC, wherein the other OCC is a cyclic shift version of the length-4 Walsh code.

12. The method of claim 11, wherein the other OCC comprises a length-4 Walsh code indicated by a sequence {b, c, d, a}.

13. The method of claim 1, further comprising:
scheduling one or more UEs of the plurality of UEs for a plurality of bundled resource blocks (RBs) used for transmitting the DMRS symbols;
applying a same precoder to the plurality of bundled RBs; and
providing, to the one or more UEs, indication about a size of the plurality of bundled RBs.

14. An apparatus for wireless communications by an eNodeB, comprising:
at least one processor configured to:
determine a plurality of ports of a multi-dimensional array of transmit antennas and a number of spatial multiplexed layers for transmission to a plurality of user equipments (UEs), and
configure a demodulation reference signal (DMRS) pattern by multiplexing one or both of the layers and the ports in the DMRS pattern using an orthogonal cover code (OCC) and one or more code division multiplexing (CDM) groups; and
a transceiver configured to:
provide, to the plurality of UEs, an indication about the configured DMRS pattern using radio resource control (RRC) signaling, wherein the indication comprises multiple bits, wherein a value of the multiple bit indication indicates whether the configured DMRS pattern is a legacy DMRS pattern or a non-legacy DMRS pattern, and wherein the indication identifies at least the ports in the DMRS pattern, and
transmit DMRS symbols based on the configured DMRS pattern using the multiplexed layers and the ports.

15. A method for wireless communications by a user equipment (UE), comprising:
receiving, from a base station (BS), a downlink (DL) control signaling including an indication indicative of a demodulation reference signal (DMRS) pattern, wherein the indication comprises multiple bits, wherein a value of the multiple bit indication indicates whether the configured DMRS pattern is a legacy DMRS pattern or a non-legacy DMRS pattern, and wherein the indication identifies at least ports in the DMRS pattern for DMRS symbol transmission;
determining, based on the DL control signaling, ports of a multi-dimensional array of antennas and spatial multiplexed layers for DMRS symbol transmission, one or both of the ports and the layers being multiplexed in the DMRS pattern using an orthogonal cover code (OCC) and one or more code division multiplexing (CDM) groups; and
receiving the DMRS symbols based on the determination.

16. The method of claim 15, wherein:
the OCC comprises a length-2 OCC;
the one or more CDM groups comprise a first CDM group allocated to a first pair of layers or a first pair of ports, and a second CDM group allocated to a second pair of layers or a second pair of ports;
the first CDM group and the second CDM group are non-orthogonal multiplexed on same resource elements in time and frequency domain; and
the first CDM group uses a first scrambling sequence and the second CDM group uses a second scrambling sequence.

17. The method of claim 15, wherein:
the OCC comprises a length-2 OCC;
the one or more CDM groups comprise a first CDM group allocated to a first pair of layers or a first pair of ports, and a second CDM group allocated to a second pair of layers or a second pair of ports; and
orthogonal time division multiplexing (TDM) and frequency division multiplexing (FDM) is applied between the first CDM group and the second CDM group.

18. The method of claim 15, wherein:
the OCC comprises a length-4 OCC, and
the one or more CDM groups comprise a single CDM group allocated to four layers or four ports spanning four noncontiguous resource elements (REs) in time domain.

19. The method of claim 15, wherein:
the OCC comprises a length-4 OCC,
the one or more CDM groups comprise:
a first CDM group allocated to a first set of four layers or four ports spanning four noncontiguous resource elements (REs) in time domain, and
a second CDM group allocated to a second set of four layers or four ports spanning the four noncontiguous REs in time domain; and
the first CDM group and second CDM group are non-orthogonal multiplexed on same resource elements in time and frequency domain, wherein the first CDM group uses a first scrambling sequence and the second CDM group uses a second scrambling sequence.

20. The method of claim 15, wherein the indication comprises:
first data identifying a type of multiplexing used for a first and a second CDM group; and
second data identifying a length of the OCC.

21. The method of claim 15, further comprising:
receiving an indication about the ports of the multi-dimensional array of antennas and a number of layers for transmitting the DMRS symbols using L1 control signaling on a Physical Downlink Control Channel (PDCCH).

22. The method of claim 15, further comprising:
receiving joint indication of the DMRS pattern and the ports of the multi-dimensional array of antennas using L1 control signaling.

23. The method of claim 15, wherein:
the indication comprises one bit for Physical Downlink Shared Channel (PDSCH) rate matching indication and four bits indicating the configured DMRS pattern and the ports of the multi-dimensional array of antennas.

24. The method of claim 15, further comprising:
processing, based on a same bundling boundary for co-scheduled user equipments (UEs), the DMRS symbols received within a plurality of bundled resource blocks (RBs),
wherein the same precoder was used for each port within the plurality of bundled RBs.

25. The method of claim 15, further comprising:
processing, based on a higher layer configured bundling boundary, the DMRS symbols received in a plurality of bundled resource blocks (RBs),
wherein a same precoder was used for each port within the plurality of bundled RBs.

26. An apparatus for wireless communications by a user equipment (UE), comprising:
a processor configured to:
determine, based on DL control signaling, ports of a multi-dimensional array of antennas and spatial multiplexed layers for DMRS symbols transmission, one or both of the ports and the layers being multiplexed in an orthogonal DMRS pattern using an orthogonal cover code (OCC) and one or more code division multiplexing (CDM) groups; and a transceiver configured to:

receive, from a base station, downlink (DL) control signaling including an indication indicating a demodulation reference signal (DMRS) pattern, wherein the indication comprises multiple bits, wherein a value of the multiple bit indication indicates whether the configured DMRS pattern is a legacy DMRS pattern or a non-legacy DMRS pattern, and wherein the indication identifies at least ports in the DMRS pattern for DMRS symbol transmission, and receive the DMRS symbols based on the determination.

* * * * *